FIG. 1 IR-Spectra

FIG. 2. UV-Spectra

FIG. 3 X-Ray Diffraction diagram

United States Patent Office 3,374,216
Patented Mar. 19, 1968

3,374,216
DYEABLE POLYPROPYLENE FIBERS
Kazuo Senda, Akira Ichikawa, Takao Ohzeki, Eiji Nakajima, Minoru Sasaki and Akihiko Yasui, Ohtake-shi, and Masahiro Hirose, Yamaguchi-ken, Japan, assignors to Mitsubishi Rayon Co., Ltd., Tokyo, Japan
Filed Dec. 20, 1965, Ser. No. 515,041
Claims priority, application Japan, Dec. 22, 1964, 39/72,301; May 12, 1965, 40/27,746
4 Claims. (Cl. 260—93.7)

The present invention relates to polypropylene fibers having an excellent affinity for dyestuffs enabling to form a coordinate bond with metals and displaying a superior resistance against degradation by light.

It is well known that polypropylene fibers possess various excellent points in view of physical and mechanical properties but on other hand, indicate deteriorated defect in dyeability and light resistance.

Hitherto, various attempts have been carried out to improve dyeability; and for example, a process of graft copolymerization by vinyl monomer possessing affinity for dyestuffs, a process of blend-spinning with high molecular or low molecular compounds possessing affinity for dyestuffs and a process of chemical treatment of fibers for introducing the groups possessing affinity for dyestuffs or the like have been well known.

It is described in British Patent No. 932,897 and U.S. Patent No. 2,984,635 that polypropylene is blended and spun with metal salt of an organic acid, for instance nickel stearate or zinc stearate or the like whereby such fibers can be produced as indicating affinity for dyestuffs that possess groups enabling to form a coordinate bond with those metals. But, the fibers produced on these processes do indicate merely a feeble resistance against degradation by light and oxidation and it is furthermore needed to add light stabilizers and/or antioxidants, in order to produce fibers which possess an excellent light and/or thermoxidative resistance and usability.

Moreover, Belgian Patents Nos. 579,636 and 622,739 and French Patent No. 1,351,584 described a process wherein polypropylene is added with nickel phenol phenolates or nickel phenolates which consist of one molecule of p-alkylphenol sulfide or sulfoxide or sulfone bonded with one half or 1 to 2 nickel ions and thereby light resistance of polypropylene is promoted.

But, according to the aforesaid process, namely, particularly when phenol sulfide or sulfoxide or sulfone is bonded with 1 to 2 of nickel ion, a compatibility of such a compound with polypropylene is deteriorated, so that an efficiency of raising the weathering resistance is low and said compound in a large amount must be used in order to obtain a satisfactory result.

Particularly, when it is expected to enlarge dyeability, said compound in an amount of several percent is indispensably used.

In other words, according to the aforesaid process, an addition amount must be indispensably increased and simultaneously the excellent physical property that is an original property of polypropylene fibers is impaired thereby. Namely, according as an addition amount increases, the mechanical property such as various strengths is simultaneously deteriorated and a defect of decreasing whiteness and transparency of fibers is conspicuously revealed.

The first object of the present invention is to obtain the fibers that possess an excellent affinity for dyestuffs having groups enabling to form coordinate bond with metals and to avoid to impair physical and mechanical properties or excellent original property of polypropylene fibers; and the second object of the present invention is to produce an excellent light resistance of fibers.

The present invention can be achieved by adding a small amount of intermolecular compound represented by the following general Formula I to polypropylene, that nickel phenolate or zinc phenolate is condensed with organo tin compound.

Aforementioned general formula of the present invention is as follows:

wherein R is an alkyl radical having 1 to 18 carbon atoms, X is a member selected from the group consisting of S, SO, and $SO_2$, M is a member selected from the group consisting of Ni and Zn, B is a member selected from the group consisting of $H_2O$, $NH_3$, aliphatic amines, aromatic amines and nitrogen containing cyclic aromatic compounds, $m$ is zero or an integer of 1 or 2, $n$ is an integer of 1 to 4 and $[Sn_xA]$ is a member of tin compounds selected from the following general formulae of (II)–1 to (II)–9.

$$R_2Sn=O, \text{ or } R_3SnOH \qquad (II)-1$$

wherein R is a member selected from the group consisting of alkyl, cycloalkyl, aryl, alkylaryl and aralkyl radicals having 1 to 18 of carbon atoms.

$$R_aSn(OCOR')_b \qquad (II)-2$$

wherein R is a member selected from the group consisting of alkyl, aryl, cycloalkyl, alkylaryl and aralkyl radicals having 1 to 18 of carbon atoms, R' is hydrogen or a member selected from the group consisting of alkyl, cycloalkyl, aryl, alkylaryl, aralkyl, alkylene, cycloalkylene, arylene, alkylarylene and aralkylene radicals, having 1 to 18 of carbon atoms, and $a$ and $b$ are integers of 1 to 3, and are combined to satisfy a relation of $a+b=4$.

$$R_aSn(OCOR'COOR'')_b \qquad (II)-3$$

wherein R is a member selected from the group consisting of alkyl, cycloalkyl, aryl, alkylaryl and aralkyl radicals, having 1 to 18 of carbon atoms, R' is a member selected from the group consisting of alkylene, cycloalkylene, arylene, alkylarylene and aralkylene radicals, having 1 to 18 of carbon atoms, R'' is a member selected from the group consisting of alkyl, cycloalkyl, aryl, alkylaryl and aralkyl radicals, having 1 to 18 of carbon atoms and $a$ and $b$ are integers of 1 to 3 and are combined to satisfy a relation of $a+b=4$.

$$R_aSn(OCOR'CONHR'')_b \qquad (II)-4$$

wherein R, R', R'', $a$ and $b$ have the same significances as the formula of (II)–3.

$$R'COOSn(R)_2-O-Sn(R)_2OCOR' \qquad (II)-5$$

wherein R is a member selected from the group consisting of alkyl, cycloalkyl, aryl, alkylaryl and aralkyl radicals having 1 to 18 carbon atoms, and R' is hydrogen or a member selected from the group consisting of alkyl, cycloalkyl, aryl, alkylaryl and aralkyl radicals, having 1 to 18 of carbon atoms or a member selected from the group consisting of monoester residues of aliphatic and aromatic dicarboxylic acid residual radicals having 1 to 18 of carbon atoms.

$$R_aSn(OR')_b \qquad (II)-6$$

wherein R is a member selected from the group consisting of alkyl, cycloalkyl, aryl, alkylaryl and aralkyl radicals having 1 to 18 of carbon atoms, R' is a member selected from the group consisting of alkyl, cycloalkyl, aryl, alkylaryl and aralkyl radicals having 1 to 18 of carbon atoms or a member selected from the group consisting of monoester residues of aliphatic and aromatic oxycarboxylic acid radicals and $a$ and $b$ are integers of 1 to 3 and are combined to satisfy a relation of $a+b=4$.

$$R_3SnOSnR_3 \qquad (II)-7$$

wherein R is a member selected from the group consisting of alkyl, cycloalkyl, aryl, alkylaryl and aralkyl radicals having 1 to 18 of carbon atoms.

$$R_2Sn(OR')(OCOR') \qquad (II)-8$$

wherein R is a member selected from the group consisting of alkyl, cycloalkyl, aryl, alkylaryl and aralkyl radicals, having 1 to 18 of carbon atoms, and R' is a member selected from the group consisting of alkyl, cycloalkyl, aryl, alkylaryl and aralkyl radicals, having 1 to 18 of carbon atoms or a member selected from the group consisting of aliphatic and aromatic dicarboxylic monoester residual radicals, having 1 to 18 of carbon atoms.

$$R_2Sn(A)_x \qquad (II)-9$$

wherein R is a member selected from the group consisting of alkyl, cycloalkyl, aryl, alkylaryl and aralkyl radicals, having 1 to 18 of carbon atoms and A indicates 1,3-dicarbonyl compounds. Small $x$ is dependent on the number of Sn atoms in Formulas II-1 to II-9.

Compound of the general Formula I can be produced by such process wherein nickel phenolates or zinc phenolates represented by the general formula of having the same significances for R, X, M and $m$ as in Formula I and organo tin compounds of the general formulae from (II)-1 to (II)-9 are heated in an organic solvent. Also, compound of the general Formula I can be formed in polypropylene fibers by melt-spinning a mixture of polypropylene powder, a compound of the general Formula III and a compound of the general formulae of (II)-1 to (II)-9.

A compound of the general Formula III can be produced by allowing various nitrogen containing compounds or if necessary, ammonium indicated in B, to make a coordinate bond with corresponding nickel or zinc phenolate of bis-alkylphenol sulfide, sulfoxide or sulfone and these nickel phenolate or zinc phenolate are produced by reacting sodium salt of bis-alkylphenol sulfide, sulfoxide or sulfone in an organic solvent with equimolar amount of organic or inorganic salt of nickel or zinc. It can be confirmed by the various means that a compound of the general Formula I is an intermolecular compound of a compound of the general Formula III and a compound of the general formulae of (II)-1 to (II)-9, but is not a mere mixture of the two components. Practically this is manifestly disclosed by reference examples in subsequent paragraph. And, a formation of aforesaid intermolecular compound can be understood in view of the effect which is obtained in the case of preparing polypropylene fibers.

A compound of the general Formula III, for example, nickel phenolate of 2,2'-dihydroxy-5,5'-ditetramethyl butyl diphenyl sulfone is admixed with polypropylene, and this mixture is spun into fibers and said fibers are observed under a microscope and on that occasion it is disclosed that nickel phenolate of 2,2'-dihydroxy-5,5'-ditetra-methyl butyl diphenyl sulfone indicates a lessened affinity with polypropylene and both components are separated mutually, indicating an unhomogeneous structure and in event of elongating such components into fibers, micro voids are formed around nickel phenolate in a separate presence, whereby it results to give an unfavorable opaque condition to the fibers.

Whereas, provided that an intermolecular compound represented in a general Formula I, for example, an equivalent mole of intermolecular compound of nickel phenolate of 2,2'-dihydroxy-5,5'-ditertiary octyl diphenyl sulphone and dibutyltin oxide is admixed with polypropylene, a complete homogeneous structure is indicated and opaque conditions are not seen with elongation.

The disadvantage originated in such an unhomogeneous structure does not only give unfavorable opaque conditions to the fibers, but also deteriorates efficiency in the aforesaid improvements of weathering resistance and dyeability (namely, efficiency obtained by addition on a definite amount) and thereby the mechanical properties of fibers such as tensile strength and abrasion resistance are lowered, causing nozzle clogging, thread interruption, degradation in processability and the color of dyed yarns becomes subdued, having the unsatisfactory whiteness of fibers.

When higher amines are coordinately bonded as B of the general Formula III compatibility for polypropylene is promoted to a considerable extent and an unhomogeneous structure is not indicated even if it is used individually. It has been noted, however, that when the intermolecular compound with an organo tin compound of the general formulae of (II)-1 to (II)-9 is employed in the aforesaid case, the whiteness of fibers, the mechanical properties of fibers and the brilliance of dyed articles can be further improved and the fibers possessing the aforesaid improved properties can be produced.

The intermolecular compound of the general Formula I is the most effective, provided that one mole of a compound of the general Formula III is combined with from ¼ to 1 mole of organo tin compound of the general formulae of (II)-1 to (II)-9 (based on Sn atoms).

When the organo tin compound of the general formulae of (II)-1 to (II)-9 is employed in an amount of aforesaid or lesser ratio, the fibers obtained in melt-spinning have an unhomogeneous structure and when the organo tin compound of the general formulae of (II)-1 to (II)-9 is added in an amount of apparently equivalent or more mole an intermolecular compound in equivalent or more mole can not be produced. (Refer to the reference Example II in subsequent paragraphs.)

The intermolecular compound used for the present invention, of the general Formula I possesses an excellent compatibility with polypropylene and consequently, even if addition is excessive, the mechanical properties of fibers are not impaired, but the addition in the range of 0.1 to 10% by weight for polypropylene gives the most effective commercial efficiency.

While a small addition serves well for improving weathering resistance, an addition of 0.5% by weight or more is preferable when improvement of dyeability is considered together.

The present invention can be achieved in such process that, as aforementioned the compound of the general formulae of (II)-1 to (II)-9 is admixed in a definite ratio with the compound of the general Formula III and this mixture is heated and reacted in an organic solvent and subsequently said solvent is taken off to adjust the intermolecular compound and thereby polypropylene in a definite ratio is admixed with the aforesaid mixture and the fibers are produced by melt-spinning.

As an embodiment of the present process, a compound of the general formulae of (II)-1 to (II)-9 and a compound of the general Formula III are directly admixed with polypropylene and this mixture is spun by melt-spinning, whereby the intermolecular compound is formed in the operation of melt-spinning and the similar effect as aforementioned can be obtained.

In this case the formation of intermolecular compound in the fibers can be observed by means of infrared and ultraviolet spectra (refer to the Reference Example VI).

Typical examples for the intermolecular compounds of the present invention are illustrated in view of constituent component of intermolecular compound, the compound of the general Formula III and a compound of the general formulae of (II)–1 to (II)–9 are shown independently.

The exemplifications given hereunder are merely illustrative and do not limit the present invention in any way.

The compound of the general Formula III can be possibly combined with any kind of compounds of the general formulae of (II)–1 to (II)–9 and they are effective for the object of the present invention. As typical examples for compounds of the general Formula III, are:

Nickel phenolate of 2,2'-dihydroxy-5,5'-dibutyl diphenyl sulfide,
Nickel phenolate of 2,2'-dihydroxy-5,5'-dibutyl diphenyl sulfoxide,
Nickel phenolate hydride of 2,2'-dihydroxy-5,5'-dibutyl diphenyl sulfone,
Zinc phenolate of 2,2'-dihydroxy-5,5'-dibutyl diphenyl sulfide,
Zinc phenolate of 2,2'-dihydroxy-5,5'-dibutyl diphenyl sulfoxide,
Zinc phenolate of 2,2'-dihydroxy-5,5'-dibutyl diphenyl sulfone,
Diamine nickel phenolate of 2,2'-dihydroxy-5,5'-dibutyl diphenyl sulfone,
Monoammine nickel phenolate of 2,2'-dihydroxy-5,5'-dibutyl diphenyl sulfide,
di(stearyl amine) nickel phenolate of 2,2'-dihydroxy-5,5'-dimethyl diphenyl sulfoxide,
di(stearyl amine) nickel phenolate of 2,2'-dihydroxy-5,5'-dimethyl diphenyl sulfone,
nickel phenolate of 2,2'-dihydroxy-5,5'-di(tetramethyl butyl)-diphenyl sulfide,
nickel phenolate of 2,2'-dihydroxy-5,5'-di(tetramethyl butyl)-diphenyl sulfoxide,
nickel phenolate of 2,2'-dihydroxy-5,5'-di(tetramethyl butyl)diphenyl sulfone,
nickel phenolate dihydride of 2,2'-dihydroxy-5,5'-di(tetramethyl butyl) diphenyl sulfone,
zinc phenolate of 2,2'-dihydroxy-5,5'-di(tetramethyl butyl)-diphenyl sulfide,
zinc phenolate of 2,2'-dihydroxy 5,5'-di(tetramethyl butyl)-diphenyl sulfoxide,
zinc phenolate of 2,2'-dihydroxy-5,5'-di(tetramethyl butyl)-diphenyl sulfone,
di(butylamine) nickel phenolate of 2,2'-dihydroxy-5,5'-di(tetramethyl butyl)-diphenyl sulfide,
di(butyl amine) zinc phenolate of 2,2'-dihydroxy-5,5'-di(tetramethyl butyl)-diphenyl sulfone,
mono(butyl amine) nickel phenolate of 2,2'-dihydroxy-5,5'-di(tetramethyl butyl)-diphenyl sulfide,
ethylene diamine nickel phenolate of 2,2'-dihydroxy-5,5'-di(tetramethyl butyl)-diphenyl sulfone,
di(phenyl amine) nickel phenolate of 2,2'-dihydroxy-5,5'-di(tetramethyl butyl-diphenyl sulfone,
di(pyridine) nickel phenolate of 2,2'-dihydroxy-5,5'-di(tetramethyl butyl)-diphenyl sulfone,
di(butyl amine) nickel phenolate of 2,2'-dihydroxy-5,5'-di(tetramethyl butyl)-diphenyl sulfoxide, and
di(butylamine) zinc phenolate of 2,2'-dihydroxy-5,5'-di(tetramethyl butyl)-diphenyl sulfoxide.

Typical examples for compounds of the general formulae of (II)–1 to (II)–9, are:

(II)–1: Dibutyl tin oxide, dioctyl tin oxide, diphenyl tin oxide, dibenzyl tin oxide, diethyl phenyl tin oxide, tributyl tin hydroxide and tribenzyl tin hydroxide.
(II)–2: Dibutyl tin diacetate, dibutyl tin dilaurate, dibutyl tin distearate, diotcyl tin dilaurate, tributyl tin stearate, tributyl tin maleate, dibutyl tin adipate, dibenzyl tin dilaurate, and tribenzyl tin stearate.
(II)–3: Dibutyl tin di(mono ethyl maleate), dibutyl tin di(mono ethylphthalate), and tribenzyl tin monoethyladipate.
(II)–4: Dibutyl tin di(monobutyl amido maleate) and tribenzyl tin monobutyl amido maleate.
(II)–5: Tetrabutyl distearyloxy distannoxane and tetraphenyl dilauroxy distannoxane.
(II)–6: Dibutyl dibutoxy tin, diotcyl dibutoxy tin, dioctyl dioctoxytin and tribenzyl-oxtoxy tin.
(II)–7: Bis-(tributyl tin) oxide and bis(tribenzyl tin) oxide.
(II)–8: Dibutyl monobutoxy tin stearate, dibutyl mono octoxy tin stearate and dibenzyl mono butoxy tin stearate.
(II)–9: Dibutyl tin diacetyl acetonate, dibutyl tin dibenzoyl acetonate, dibutyl tin diethyl acetoacetate, dibutyl tin distearyl acetoacetate and dibenzyl tin diacetylacetonate.

The intermolecular compound of the general Formula I in accordance with the present invention is added to polypropylene and thereby the weathering resistance is remarkably improved as aforementioned and simultaneously oxidation resistance can be considerably improved. And, besides the intermolecular compound of the general Formula I, antioxidant in phenol series and amine series, namely a synergistic agent such as dilauryl thiodipropionate and trioctadecyl phosphite which is usually employed for polypropylene, and other various additives, used generally for polypropylene fibers for example titanium oxide, and a dispersion agent—those can be added as competent agents to produce superior fibers.

The fibers in accordance with the present invention can be dyed in a deep and uniform color by the dyestuffs which can bond with metal ion such as nickel or zinc.

Generally, besides the aforementioned dyestuff known as mordant dyestuffs, a dyestuff preferred for polypropylene, having a radical which can bond with the aforesaid metals in molecules of dyestuff but which does not contain a hydrophilic radical therein, is known.

For example, o-hydroxyazo type, o,o'-dihydroxyazo type, 8-hydroxyquinoline type, o-hydroxyphenylazothiazole type and alizarin type or the like can be used for the dyestuff.

The process of dyeing can conform to any customary method, e.g. boiling, whereby, vivid, highly durable and superior dyed articles can be obtained.

And if required, as an adjuvant of dyestuff, non-ionic or anionic of surfactant is desirably used and a weak acid is preferably used as a controller of pH. Generally, it is desired to control pH in a dyeing bath in the range of 2 to 8.

Subsequently, referring to the reference examples, it is explained that the intermolecular compound of the general Formula I is not a mere mixture of constituent components, namely is not a mixture of the compound in a general Formula III and the compound of the general formulae of (II)–1 to (II)–9.

Reference Example I.—Nickel phenolate of 2,2'-dihydroxy-5,5'-di(tetra·methyl·butyl)-diphenyl sulfone. (This compound, according to the general Formula III, corresponds to the case of R: tert $C_8H_{17}$, X: $SO_2$, M: Ni and $m=0$. Hereafter this compound will be abbreviated as Compound A.) Dibutyltin distearate. (This compound, according to the general Formula II-2, is corresponded with a case of R: $C_4H_9$, R': $C_{17}H_{35}$, $a=2$ and $b=1$. Hereafter this compound will be abbreviated as Compound B.)

The aforesaid two compounds under the following ratio were heated at 80° C. in benzene, the benzene was removed and the substance obtained therefrom had a melting point, as seen in Table 1, entirely different from the melting points of the two original components (No. 1 and No. 5).

And, as illustrated in the Reference Example III the value of IR-spectra was entirely different from the value of A or B and said substance is not a mixture of the two components (hereafter the mixture of the two components will be abbreviated as $A+B$); but is an intermolecular compound (hereafter this intermolecular compound will be abbreviated as $A \times B$). In other words, the formation of an intermolecular compound has been confirmed.

TABLE 1

| No. | Molar ratio (A/B) | Melting point (°C.) |
|---|---|---|
| 1 | 1/0 | (1) |
| 2 | 4/1 | 105 |
| 3 | 2/1 | 50 |
| 4 | 1/1 | 25 |
| 5 | 0/1 | 47 |

[1] 360° C. or more.

*Reference Example II.*—The Compound A and dibutyl·tin·oxide (according to the general formula of II–1, this corresponds to the case of R: butyl. Hereafter this compound will be abbreviated as C) under a mixture ratio in Table 2 is heated in benzene and allowed to react, whereby an intermolecular compound (hereafter this will be abbreviated as $A \times C$) is formed, dissolved in benzene.

Dibutyltinoxide is not dissolved in benzene, so that a component C, which did not participate in the formation of intermolecular compound with Compound A, remained as an insoluble component in benzene. (Nos. 3, 4, 5.)

TABLE 2

| No. | Compound Ag | (Mole) | Cg | (Mole) | Molar ratio (A/C) | Melting point of produced compound, °C. | Residue Cg | (Mole) |
|---|---|---|---|---|---|---|---|---|
| 1 | 26.5 | (1/20) | 6.3 | (1/40) | 2/1 | 235 | 0 | |
| 2 | 26.5 | (1/20) | 12.5 | (1/20) | 1/1 | 230 | 0 | |
| 3 | 26.5 | (1/20) | 25.0 | (2/20) | 1/2 | | 13 | (1/20) |
| 4 | 26.5 | (1/20) | 37.5 | (3/20) | 1/3 | | 26.5 | (2/20) |
| 5 | 0 | | 25.0 | (2/20) | 0/1 | >360 | 25.0 | (2/20) |

As seen in Table 2, Compound C forms the intermolecular compound, one mole or less of Compound C to one mole of Compound A.

Figure 1:
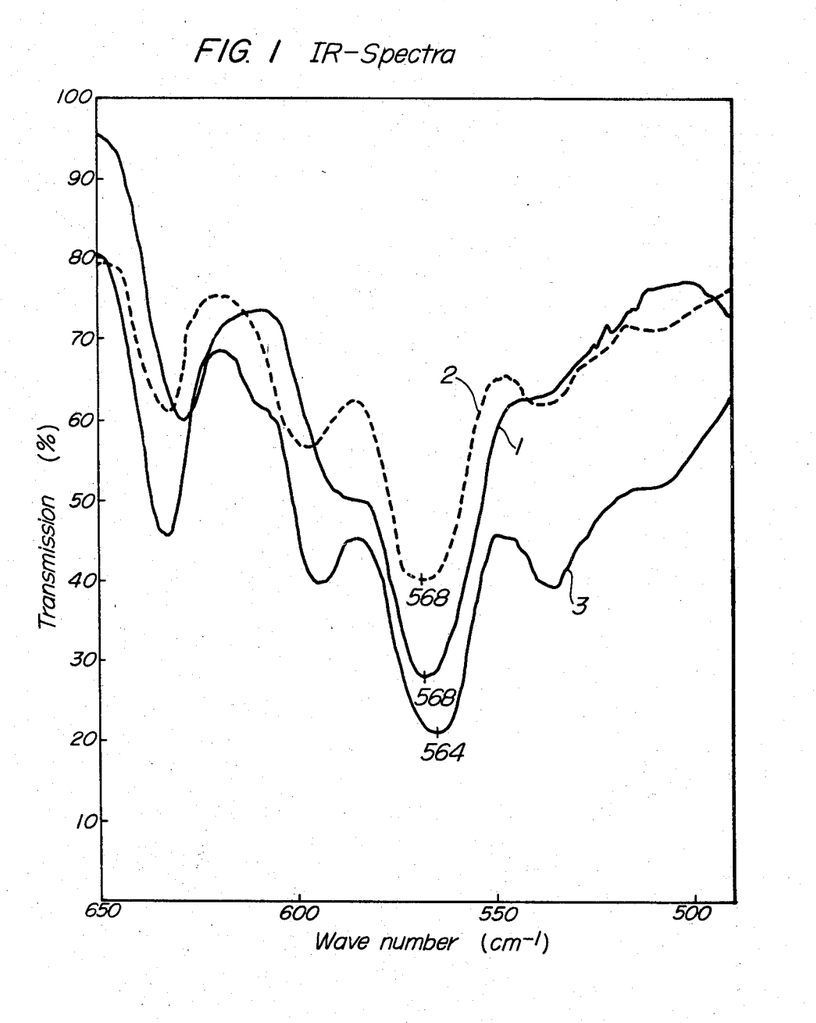

*Reference Example III.*—The infrared absorption spectrum for an intermolecular compound $(A \times B)$ which was obtained in No. 3 and No. 4 of Reference Example I was measured by a process of Nujol Paste, and on other hand, the infrared absorption spectra for Compound A, Compound B and a mixture of aforesaid dual compounds $(A+B)$ (a Compound A and a Compound B were mixed at a common temperature in a paste state by means of Nujol) were measured in contrast with the spectrum of intermolecular compound $(A \times B)$. One example is indicated in FIG. 1. FIG. 1 indicates the infrared absorption spectrum, wherein a transmission (percent) is taken on the ordinate and a wave number (cm.$^{-1}$) is indicated on the abscissa and the infrared absorption spectra for Compound A, a mixture of Compound A and Compound B $(A+B)$ and an intermolecular compound $(A \times B)$ obtained in No. 3 are shown in digit numbers of (1), (2) and (3) respectively.

The maximum absorption located at 568 cm.$^{-1}$ for (1) and (2) is shifted to 564 cm.$^{-1}$ for (3) and this proves evidently that the substance obtained in No. 3 is not a simple mixture.

Similarly, a substance obtained in No. 4 was measured and in this case, maximum absorption shifted to 565 cm.$^{-1}$ and other aspects were identical with No. 3.

An intermolecular compound obtained in the Reference Example II was measured, but in this occasion, an intensive absorption by dibutyl·tin·oxide was revealed in this domain of wave number and thereby a manifest chart was not obtained.

*Reference Example IV.*—An intermolecular compound $(A \times C)$ obtained in No. 2 of Reference Example II was dissolved in chloroform and thereby the ultraviolet absorption spectrum was measured. For the sake of comparison, the ultraviolet absorption spectrum for Compound A is individually indicated in FIG. 2.

Figure 2:
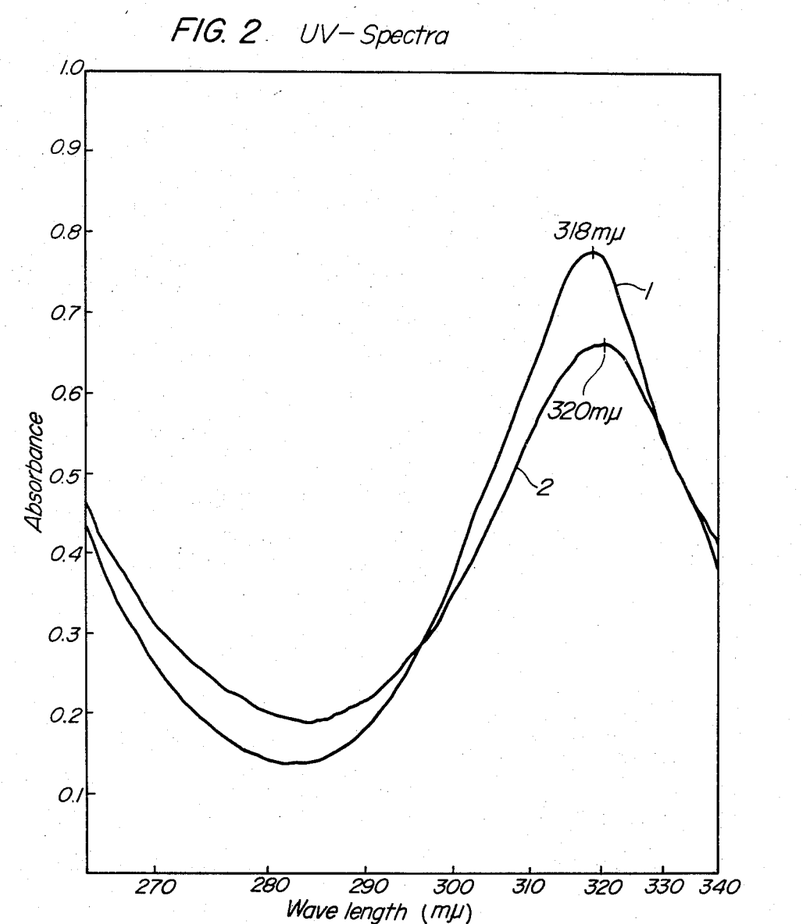

According to the ultraviolet absorption spectrum in FIG. 2, the absorbance (percent) is taken on the ordinate and the wave length (m$\mu$) is shown on the abscissa, wherein the digit number (1) indicates an individual diagram for Compound A and a wave length showing the maximum absorption is located at 318 m$\mu$, but the number (2) indicates a spectrum diagram for intermolecular compound $(A \times C)$ and the maximum in this case is shifted to 320 m$\mu$; and this proves manifestly that said compound $(A \times C)$ is not a mere mixture of Compound A and Compound C.

Figure 3:
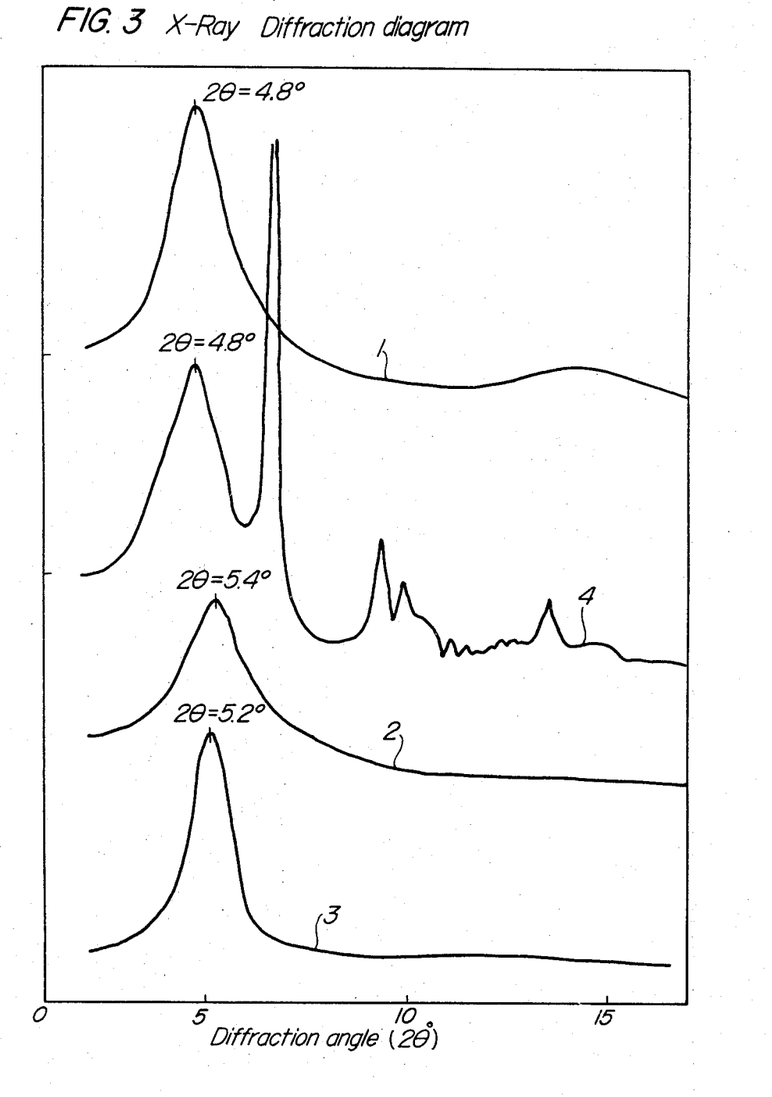

*Reference Example V.*—The X-ray diffraction diagrams for intermolecular compounds obtained in Reference Example II are shown in FIG. 3. According to FIG. 3, the abscissa indicate the diffraction angle and the number of (1) is a diagram for the individual of Compound A and a diffraction peak was identically revealed at the diffraction angle of $2\theta = 4.8°$.

The number of (2) indicates an intermolecular compound $(A \times C : A/C = 1/1)$ in Reference Example II and the number of (3) shows another case of intermolecular compound $(A \times C : A/C = 2/1)$ in Reference Example II and referring to FIG. 3, it is manifest that the diffraction peak is shifted to $2\theta = 5.2°$ to $5.4°$.

The acute peak for a simple mixture of Compound A and Compound C (4) arises by an influence of Compound C (dibutyl tin oxide), but such a peak is not visible in the aforesaid intermolecular compounds of (2) and (3).

Such a phenomenon is also seen in the formation of mixed crystal of Compound A and Compound B; and then the solubilities of said compounds into various organic solvents and diffusion behavior in n-heptane at 25° C. were observed simultaneously which revealed that the intermolecular compound $(A \times B$ or $A \times C)$ consisting of Compound A and Compound B or Compound C can exist in an organic solvent as an intermolecular compound of components without being separated.

The diffusion constants in n-heptane at 25° C. are indicated in Table 3:

TABLE 3.—DIFFUSION CONSTANT D

| Compounds: | $D \times 10^5$ |
|---|---|
| A | 0.324 |
| $A \times B$ | 0.390 |
| $A \times C$ | 0.436 |

*Reference Example VI.*—Ten percent (v.s. polyproylene) of a composition of Compound A and Compound B in an equivalent molar ratio was admixed with polypropylene and fibers was obtained from said admixture by melt-spinning at 250° C. The infrared absorption spectrum of said fibers is indicated in FIG. 4.

Figure 4:
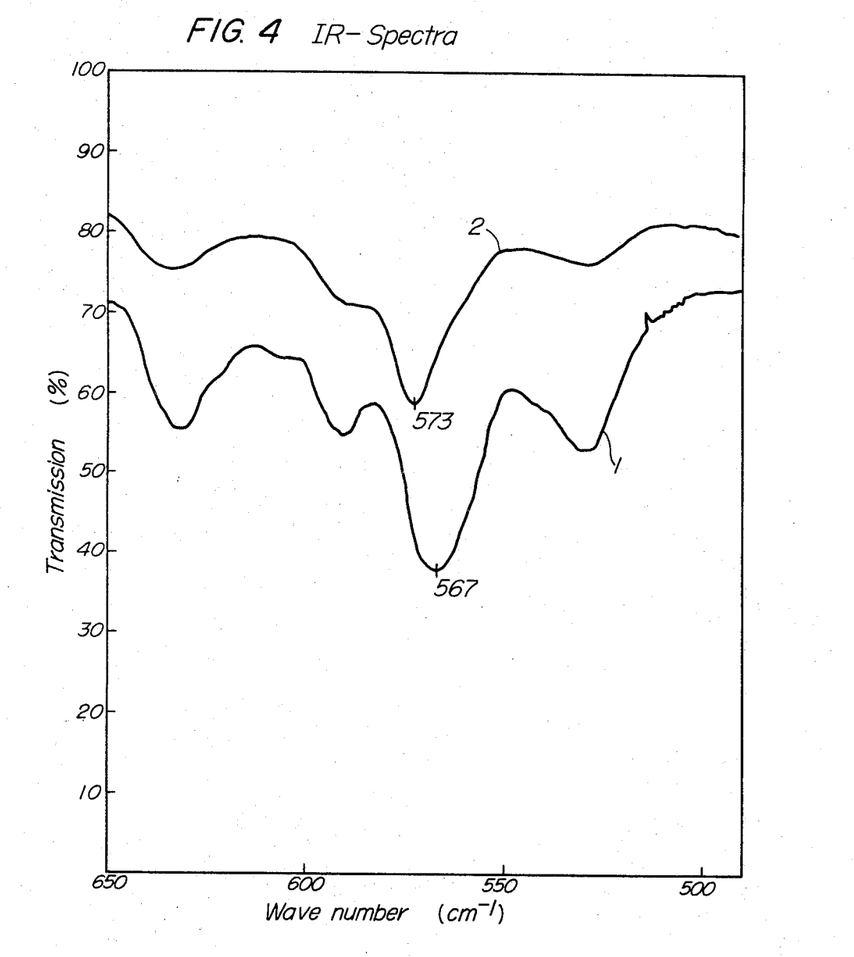

The same significances similar as FIG. 1 are given on the ordinate and the abscissa of FIG. 4, wherein the number of (1) indicates the case of the fibers spun from the mixture of Compound A and Compound B and for comparison (2), the infrared absorption spectrum is given for the fibers spun from Compound A mixed in equal amount. The absorption of the compound was located at 568 cm.$^{-1}$ in FIG. 1, but in this occasion it shifted to 573 cm.$^{-1}$, and according to the fibers spun from the mixture of Compound A and Compound B, it further shifted to 567 cm.$^{-1}$.

From this fact, it can be confirmed that even if Compound A and Compound B are separately admixed with polypropylene, an intermolecular compound $(A \times B)$ is produced in the process of the fiber formation.

The experimental examples are illustrated below, but these should not be considered as limitative of the present invention. All percentages given herein represent weight percentages unless otherwise indicated.

*Example I*

Nickel phenolate of 2,2'-dihydroxy-5,5'-di(tetramethylbutyl)-diphenyl sulfone (A) and dibutyltin oxide (C) in a mixture ratio as indicated in Table 4 was heated in benzene and allowed to react and thereby intermolecular compound $(A \times C)$ with the respective molar ratios were obtained.

The intermolecular compound obtained was admixed with a crystalline polypropylene, possessing an intrinsic viscosity of 1.4 (hereafter intrinsic viscosity is measured with tetraline at 135° C.) in a mixture ratio indicated in Table 4, wherein as anti-oxidant, the 1% by weight of Santonox and as synergistic agent, the 0.4% by weight of trioctadecyl phosphite were added and well mixed.

The resulting mixture was allowed to form pellets at a temperature of 220° C. and was spun by melt-spinning at a temperature of 240° C. and was stretched 4.8 times at a temperature of 130° C. The physical properties of the fibers obtained are shown in Table 4:

TABLE 4

| No. | A/C (Mole) | A×C Percent (wt.) | D.S. (g./d.) | D.E. (percent) | W.G. (percent) |
|---|---|---|---|---|---|
| 1 | 0/1 | 2.50 | 5.30 | 30.4 | 64 |
| 2 | 1/1 | 4.00 | 5.55 | 28.9 | 97 |
| 3 | 2/1 | 3.38 | 5.46 | 30.0 | 97 |
| 4 | 4/1 | 3.06 | 5.40 | 29.5 | 94 |
| 5 | 8/1 | 2.91 | 5.35 | 32.4 | 88 |
| 6 | 1/0 | 2.75 | 5.30 | 28.0 | 85 |

In Table 4, No. 1 and No. 6 are the comparable examples. Hereafter, D.S. indicates tensile strength in the dry condition, D.E. indicates ultimate elongation (dry) and W.R. is weathering resistance. (Note: W.R. is measured by durability with respect to D.S. after 300-hr. irradiation of Wether-O-meter.) "G./d." represents gram per denier. Those filaments were scoured in a condition as indicated in subsequent paragraph (a) and the scoured filaments, after washed by water and air-dried, were dyed under condition (b). The dyed filaments, after washing with water, were treated with soaping as indicated in condition (c) and then the comparisons were carried out for the dyeabilities of the washed and air-dried fibers.

(a) SCOURING CONDITIONS

Scouring bath:
   Scoural No. 400 (Kao Sekken Co.), 0.5 g./l.
   Sodium pyrophosphate, 0.1 g./l.
Liquor ratio: 50:1.
Temperature: Treatment was carried out at a temperature of 70° C. for 20 minutes.

(b) DYEING CONDITIONS

Dyeing bath:
   Dye; National polypropylene scarlet RBM (Allied Chemical Co.), 10% o.w.f.
   Dispersant; Mypo (Nippon Yushi Co.), 10% o.w.f.
   Dyeing assistant; 0.2 gr./l.
Liquor ratio: 50:1.
Temperature: The temperature was raised from 50° C. to 90° C. during 30 minutes and the dyeing was completely carried out for an additional 60 minutes.

(c) SOAPING CONDITIONS

Soaping bath:
   Scoural No. 400 (Kao Sekken Co.), 0.5 g./l.
   Sodium carbonate, 0.5 g./l.
Liquor ratio: 50:1.

Temperature: The treatment was carried out totally at a temperature of 90° C. for 20 minutes.

TABLE 5

| No. | Dyeability (percent) | Brightness | Light Fastness (grade) |
|---|---|---|---|
| 1 | None | | |
| 2 | 88 | 5 | 6< |
| 3 | 85 | 5 | 6< |
| 4 | 85 | 5 | 6< |
| 5 | 72 | 4 | 6< |
| 6 | 61 | 3 | 6< |

In Table 5, the dyeability was colorimetrically measured on residual solution; the brightness was determined by observation, assuming the most superior as 5 and the most inferior as 1, and the light fastness was determined by Fade-O-meter with Blue scale according to JIS–L–1044 (1959).

(Note: In Table 5, No. 1 and No. 6 indicate examples for comparison.)

The cross sections of the dyed filaments were observed microscopically and spotted patterns were seen on the dyed portions of the filaments in No. 5 and No. 6, whereas the uniformly dyed patterns were noted in the filaments of No. 2 to No. 4.

*Example II*

Nickel phenolate of 2,2'-dihydroxy-5,5'-di(tetramethyl butyl)diphenyl sulfone (A) and dibutyltin oxide (B) in a mixture ratio, as indicated in Table 6 were heated in benzene and allowed to react and thereby intermolecular compounds $(A \times B)$ with the respective molar ratios were obtained.

The respective intermolecular compounds obtained were admixed with a crystalline polypropylene in mixture ratios as indicated in Table 6, possessing intrinsic viscosity of 1.4, wherein 0.1% by weight of Santonox (Monsanto Chemical Co.), as an antioxidant and 0.4% by weight of trioctadecyl phosphite, as a synergistic agent were added and well mixed.

The resulting mixture were formed into pellets at a temperature of 220° C. and spun by a process of melt-spinning at a temperature of 240° C. and stretched 4.8 times at a temperature of 130° C.

The physical properties of the filaments are indicated in Table 6.

TABLE 6

| No. | A/B (mole) | A×B percent (Wt.) | D.S. (g./d.) | D.E. (percent) | W.R. (percent) |
|---|---|---|---|---|---|
| 1 | 0/1 | 2.50 | 5.45 | 30.4 | 60 |
| 2 | 1/1 | 6.75 | 5.50 | 29.5 | 97 |
| 3 | 2/1 | 4.75 | 5.54 | 29.0 | 98 |
| 4 | 3/1 | 4.25 | 5.55 | 28.0 | 96 |
| 5 | 4/1 | 3.75 | 5.60 | 28.0 | 97 |

In Table 6, No. 1 is an example for comparison of the present invention.

The comparison of the dyeability was carried out in accordance with the same conditions in Example I. The results were indicated in Table 7.

TABLE 7

| No. | Dyeability | Brightness | Light-Fastness (Grade) |
|---|---|---|---|
| 1 | None | | |
| 2 | 88 | 5 | 6< |
| 3 | 85 | 5 | 6< |
| 4 | 86 | 5 | 6< |
| 5 | 84 | 5 | 6< |

In Table 7, No. 1 is an example for comparison of the present invention.

The cross sections of the dyed filaments were observed under a microscope and thereby the uniformly dyed conditions were observed in all the filaments.

*Example III*

The 2.75% by weight of nickel phenolate of 2,2'-dihydroxy-5,5'-di(tetramethyl butyl) diphenyl sulfone (A) and the 0.16% to 1.25% by weight of dibutyltin oxide (C) (as in Table 8) were admixed with a crystalline polypropylene possessing an intrinsic viscosity of 1.4, wherein 0.15% by weight of Santonox (Monsanto Chemical Co.), as an antioxidant and 0.4% by weight of trioctadecyl phosphite, as a synergistic agent were added and well mixed.

The resulting mixture were formed into pellets at a temperature of 220° C. and spun by a process of melt-spinning at a temperature of 240° C. and stretched in 4.8 times at a temperature of 130° C.

The physical properties of the resulted filaments are shown in Table 8.

The formation of the intermolecular compound in the produced filaments was confirmed by ultraviolet and infrared absorption spectra.

TABLE 8

| No. | Compound A (Percent) | Compound C (Percent) | A/C (Mole) | D.S. (g./d.) | D.E. (Percent) | W.R. (Percent) |
|---|---|---|---|---|---|---|
| 1 | 2.75 | --- | 1/0 | 5.30 | 28.0 | 85 |
| 2 | 2.75 | 1.25 | 1/1 | 5.50 | 30.4 | 97 |
| 3 | 2.75 | 0.63 | 2/1 | 5.46 | 30.5 | 97 |
| 4 | 2.75 | 0.31 | 4/1 | 5.35 | 29.6 | 94 |
| 5 | 2.75 | 0.16 | 8/1 | 5.40 | 33.5 | 88 |
| 6 | 0 | 2.50 | 0/1 | 5.30 | 30.4 | 64 |

In Table 8, No. 1 and No. 6 are examples for comparison of the present invention. The dyeability was tested in accordance with the same conditions as in Example I and the testing results are shown in Table 9.

TABLE 9

| No. | Dyeability | Brightness | Light Fastness (Grade) |
|---|---|---|---|
| 1 | 61 | 3 | 6< |
| 2 | 88 | 5 | 6< |
| 3 | 85 | 5 | 6< |
| 4 | 85 | 5 | 6< |
| 5 | 72 | 4 | 6< |
| 6 | None | --- | --- |

In Table 9, No. 1 and No. 6 are examples for comparison of the present invention.

The cross sections of the dyed filaments were microscopically observed; the filaments in No. 1 and No. 5 were dyed unhomogeneously but the filaments in No. 2 to No. 4 were dyed uniformly.

*Example IV*

An intermolecular compound, consisting of 27.5 grams of nickel phenolate mono hydrate of 2,2'-dihydroxy-5,5' - di(tetra-methyl-butyl)diphenyl sulfone and 11.9 grams of dibutyl·tin·dibenzoate was admixed with 2 kg. of crystalline polypropylene, possessing an intrinsic viscosity of 1.4, wherein an antioxidant and a synergistic agent were added and the fiber was prepared similarly as in Example I.

The produced filaments indicated physical properties of D.S.: 5.85 g./d., D.E.: 32.5% and W.R.: 98%; and the filaments, dyed similarly as Example I, indicated testing results of dyeability: 79%, brightness: 5 and light fastness: 6< grade.

*Example V*

2.0% of zinc phenolate of 2,2'-dihydroxy-5,5'-di(tetramethyl butyl)diphenyl sulfone, 0.5% of tin compound in Table 10, an antioxidant and a synergistic agent were admixed with a crystalline polypropylene, possessing an intrinsic viscosity of 2.2 and fiber was prepared as in Example I. The physical properties of the produced fibers are shown in Table 10. The formation of the intermolecular compound in the produced filaments was confirmed by infrared absorption spectrum.

TABLE 10

| No. | Tin compound | D.S. (Percent) | D.E. (Percent) | W.R. (Percent) |
|---|---|---|---|---|
| 1 | $(C_6H_5)_2Sn(OCOC_{11}H_{23})_2$ | 5.85 | 30.1 | 94 |
| 2 | $(C_4H_9)_2Sn(OCOC_2H_4COOC_{12}H_{25})_2$ | 6.02 | 27.0 | 96 |
| 3 |  | 5.90 | 29.5 | 93 |
| 4 | None | 5.30 | 28.0 | 85 |

In Table 10, No. 4 is an example for comparison of the present invention.

As a dyestuffs, National Polypropylene Dark Blue—2BM was employed and the dyeability test was carried out with the same conditions as in Example I. The testing results are indicated in Table 11.

TABLE 11

| No. | Dyeability (Percent) | Brightness | Light Fastness (Grade) |
|---|---|---|---|
| 1 | 90 | 5 | 6< |
| 2 | 86 | 5 | 6< |
| 3 | 88 | 5 | 6< |
| 4 | 62 | 5 | 5-6 |

In Table 11, No. 4 is an example for comparison of the present invention.

*Example VI*

An intermolecular compound prepared as in Example I from 27.5 grams (1/20 mole) of nickel phenolate monohydrate of 2,2'-dihydroxy-5,5'-di(tetramethyl butyl) diphenyl sulfone and 20.0 grams (1/40 mole) of $$(C_4H_9)_2Sn(OCOC_2H_4CONHC_{12}H_{25})_2$$

was admixed with 1 kg. of crystalline polypropylene, having an intrinsic viscosity of 1.4, wherein an antioxidant and a synergistic agent were added and thereby the fiber was produced as in Example I.

The produced filaments indicated the physical properties of D.S.: 5.25 g./d., D.E.: 32.8% and W.R.: 95%. The dyeability test was carried out, resulting as in Example I; dyeability: 80%, brightness: 5 and light fastness (grade): 6<.

*Example VII*

2.5% of nickel phenolate of 2,2'-dihydroxy-5,5'-ditertiaryoctyl diphenyl sulfone and 0.5% of dibutyldilauroxytin were admixed with a crystalline polypropylene, possessing an intrinsic viscosity of 1.4, wherein an antioxidant and a synergistic agent were added and thereby the fiber was produced as in Example I.

The formation of the intermolecular compound in the fiber was observed by infrared absorption spectrum.

The produced filaments indicated the physical properties of D.S.: 5.40 g./d., D.E.: 30.3% and W.R.: 93%. The dyeability test was carried out in accordance with Example III; the results were—dyeability: 92%, brightness: 5, and light fastness (grade): 6<.

*Example VIII*

2.5% of nickel phenolate of 2,2'-dihydroxy-5,5'-ditertiaryoctyl diphenyl sulfone and 0.2% of bis(tributyl tin) oxide were admixed with a crystalline polypropylene, possessing an intrinsic viscosity of 1.4, wherein an antioxidant and a synergistic agent were added and thereby the fiber was produced as in Example I. The formation of the intermolecular compound in the fiber was observed by infrared absorption spectrum. The produced filaments indicated the physical properties were D.S.: 5.80 g./d., D.E.: 26.5% and W.R.: 96%. Dyeability: 88%, brightness: 5 and light fastness (grade): 6<, according to the test set forth in Example III.

*Example IX*

The 2.5% of compound, prepared by coordinate-bonding butylamine to nickel phenolate of 2,2'-dihydroxy-5,5'- di(tertiaryoctyl)diphenyl sulfone, and the 0.4% of tin compound in Table 5 were admixed with a crystalline polypropylene having an intrinsic viscosity of 1.4, wherein an antioxidant and a synergistic agent were added and the fiber was produced as in Example I. The physical properties of the produced filaments are indicated in Table 12.

TABLE 12

| No. | Tin compound | D.S. (g./d.) | D.E. (percent) | W.R. (percent) |
| --- | --- | --- | --- | --- |
| 1 | $(C_4H_9)_3SnOC_4H_9$ | 5.32 | 30.2 | 94 |
| 2 | $(C_6H_5)_3SnOC_{12}H_{25}$ | 5.45 | 32.4 | 93 |
| 3 | $C_4H_9Sn(OC_{12}H_{25})_3$ | 5.40 | 33.0 | 95 |
| 4 | $(CH_3)_2Sn\begin{smallmatrix}OC_{12}H_{35}\\OC_{17}H_{35}\end{smallmatrix}$ | 5.45 | 28.5 | 96 |
| 5 | None | 5.40 | 29.0 | 90 |

In Table 12, No. 5 is an example for comparison.

The dyeability test for the produced filaments was carried out as in Example I and the testing results are shown in Table 13.

TABLE 13

| No. | Dyeability (Percent) | Brightness | Light Fastness (Grade) |
| --- | --- | --- | --- |
| 1 | 84 | 5 | 6< |
| 2 | 83 | 5 | 6< |
| 3 | 80 | 5 | 6< |
| 4 | 85 | 5 | 6< |
| 5 | 80 | 3 | 6< |

In Table 13, No. 5 is an example for comparison of the present invention.

Example X

An intermolecular compound prepared as in Example I from 45 grams (1/20 mole) of lauryl amine complex of nickel phenolate of 2,2'-dihydroxy-5,5'-dibutyl diphenyl sulfone and 10 grams (1/50 mole) of dibutyltin distearate was admixed with a crystalline polypropylene possessing an intrinsic viscosity of 2.2, whereby the fibers was produced as in Example I.

The produced filament indicated the physical properties of D.S.: 6.55 g./d., D.E.: 25.5% and W.R.: 95%.

The dyeability test for the dyed filaments was carried out as in Example I, the results were—dyeability: 75%, brightness: 5, and light fastness (grade): 6<.

Example XI

Nickel phenolate of 2,2'-dihydroxy-5,5'(tetra-methylbutyl)diphenyl sulfoxide (Note: Hereafter abbreviated as Compound D) and dibutyltin distearate (abbreviated E) under a mixture ratio as shown in Table 14 were heated in benzene and allowed to react together with and thereby each intermolecular compound ($D \times E$) in each molar ratio was produced.

As in Example I, the fiber was produced and the comparison test for the dyeability was carried out. The results are indicated in Table 14 and Table 15.

TABLE 14

| No. | D/E (Mole) | D×E (Percent) (Wt.) | D.S. (g./d.) | D.E. (Percent) | W.R. (Percent) |
| --- | --- | --- | --- | --- | --- |
| 1 | 1/1 | 3.92 | 5.42 | 28.5 | 95 |
| 2 | 2/1 | 3.30 | 5.38 | 29.0 | 96 |
| 3 | 3/1 | 3.04 | 5.40 | 30.1 | 97 |
| 4 | 4/1 | 2.98 | 5.35 | 30.5 | 95 |
| 5 | 1/0 | 2.67 | 5.25 | 31.5 | 83 |

In Table 14, No. 5 is an example for comparison of the present invention.

TABLE 15

| No. | Dyeability (Percent) | Brightness | Light Fastness (Grade) |
| --- | --- | --- | --- |
| 1 | 88 | 5 | 6< |
| 2 | 89 | 5 | 6< |
| 3 | 87 | 5 | 6< |
| 4 | 86 | 5 | 6< |
| 5 | 84 | 3 | 6< |

In Table 15, No. 5 is a comparison example of the present invention.

Example XII

Nickel phenolate of 2,2'-dihydroxy-5,5'-dibutyl diphenyl sulfide (note: hereafter abbreviated as Compound F) and dibutyltin distearate (abbd. E) under a mixture ratio, as indicated in Table 16 were heated in benzene and allowed to react and then, the intermolecular compound in the respective molar ratios (note: hereafter, abbreviated as compound $F \times E$) was produced, whereby the fibers was spun as in Example I and the comparison test was carried out for the dyeability. The results are indicated in Table 16 and Table 17.

TABLE 16

| No. | F/E (Mole) | F×E (Percent) (Wt.) | D.S. (g./d.) | D.E. (Percent) | W.R. (Percent) |
| --- | --- | --- | --- | --- | --- |
| 1 | 1/1 | 6.50 | 5.48 | 30.1 | 96 |
| 2 | 2/1 | 4.50 | 5.30 | 29.1 | 95 |
| 3 | 4/1 | 3.50 | 5.35 | 28.0 | 95 |
| 4 | 1/1 | 2.50 | 5.40 | 28.5 | 86 |

In Table 16, No. 4 is an example for comparison of the present invention.

TABLE 17

| No. | Dyeability | Brightness | Light Fastness (Grade) |
| --- | --- | --- | --- |
| 1 | 89 | 5 | 6< |
| 2 | 84 | 5 | 6< |
| 3 | 88 | 5 | 6< |
| 4 | 66 | 3 | 6< |

In Table 17, No. 4 is an example for comparison of the present invention.

Example XIII

An intermolecular compound prepared as in Example I from 26.7 grams (1/20 mole) of nickel phenolate mono hydrate of 2,2'-dihydroxy-5,5'-dibutyl diphenyl sulfoxide and 17.5 grams (1/20 mole) of dibutyl tin maleate was admixed with 2 kg. of crystalline polypropylene having an intrinsic viscosity of 2.2, whereby the fiber was produced as in Example I.

The filaments of the produced fibers indicated the physical properties of D.S.: 6.55 g./d., D.E.: 28.5%, W.R.: 96%, dyeability: 70%, brightness: 5 and light fastness (grade): 6<.

What we claim is:

1. Dyeable polypropylene fibers containing an intermolecular compound of nickel or zinc phenolate and organo tin compound, represented by the general formula $$\left[ \begin{array}{c} \begin{array}{cc} R & R \\ \diagup\!\!\!\!\diagdown & \diagup\!\!\!\!\diagdown \\ | & -X- & | \\ \diagdown\!\!\!\!\diagup & \diagdown\!\!\!\!\diagup \\ O & \diagdown\;M\;\diagup\; O \\ & \uparrow \\ & (B)_m \end{array} \end{array} \right]_n [Sn_xA]_x \quad (I)$$

wherein R is an alkyl radical having 1 to 18 carbon atoms, X is a member selected from the group consisting of S, SO and $SO_2$, M is a member selected from the group consisting of Ni and Zn, B is a member selected from the group consisting of $H_2O$, $NH_3$, aliphatic amines, aromatic amines and nitrogen containing cyclic aromatic compounds, m is zero or an integer of 1 or 2, n is an integer of 1 to 4, and $[Sn_xA]$ is a tin compound, selected from the compounds represented by subsequent general formulae of (II)-1 to (II)-9;

$$R_2Sn=O \text{ or } R_3SnOH \quad (II)-1$$

wherein R is a member selected from the group consisting of alkyl, cycloalkyl, aryl, alkylaryl and aralkyl radicals, having 1 to 18 carbon atoms;

$$R_aSn(OCOR')_b \quad (II)-2$$

wherein R is a member selected from the group consisting of alkyl, cycloalkyl, aryl, alkylaryl and aralkyl radicals, having 1 to 18 carbon atoms, R' is hydrogen or a member selected from the group consisting of alkyl, cycloalkyl, aryl, alkylaryl, aralkyl, alkylene, cycloalkylene, arylene, alkylarylene and aralkylene radicals, having 1 to 18 carbon atoms, and $a$ and $b$ are integers of 1 to 3 which satisfy $a+b=4$;

$$R_aSn(OCOR'COOR'')_b \quad (II)-3$$

wherein R is a member seected from the group consisting of alkyl, cycloalkyl, aryl, alkylaryl, and aralkyl radicals, having 1 to 18 carbon atoms, R' is a member selected from the group consisting of alkylene, cycloalkylene, arylene, alkylarylene and aralkylene radicals, having 1 to 18 carbon atoms, R'' is a member selected from the group consisting of alkyl, cycloalkyl, aryl, alkylaryl and aralkyl radicals, having 1 to 18 carbon atoms and $a$ and $b$ are an integer of 1 to 3 which satisfy $a+b=4$;

$$R_aSn(OCOR'CONHR'')_b \quad (II)-4$$

wherein the same significances in the general formula of (II)-3 are given for R, R', R'', $a$ and $b$;

$$R'COOSn(R)_2\text{—O—}Sn(R)_2OCOR' \quad (II)-5$$

wherein R is a member selected from the group consisting of alkyl, cycloalkyl, aryl, alkylaryl and aralkyl radicals, having 1 to 18 carbon atoms, R' is hydrogen or a member selected from the group consisting of alkyl, cycloalkyl, aryl, alkylaryl and aralkyl radicals, having 1 to 18 carbon atoms, or a member selected from the group consisting of monoester residues of aliphatic and aromatic dicarboxylic acid radicals, having 1 to 18 carbon atoms;

$$R_aSn(OR')_b \quad (II)-6$$

wherein R is a member selected from the group consisting of alkyl, cycloalkyl, aryl, alkylaryl, and aralkyl radicals, having 1 to 18 carbon atoms, R' is a member selected from the group consisting of alkyl, cycloalkyl, aryl, alkylaryl, and aralkyl radicals or a member selected from the group consisting of monoester residues of aliphatic and aromatic oxycarboxylic acid radicals and $a$ and $b$ are an integer of 1 to 3 which satisfy $a+b=4$;

$$R_3SnOSnR_3 \quad (II)-7$$

wherein R is a member selected from the group consisting of alkyl, cycloalkyl, aryl, alkylaryl and aralkyl radicals, having 1 to 18 carbon atoms;

$$R_2Sn(OR')(OCOR'') \quad (II)-8$$

wherein R is a member selected from the group consisting of alkyl, cycloalkyl, aryl, alkylaryl and aralkyl radicals, having 1 to 18 carbon atoms, R' is a member selected from the group consisting of alkyl, cycloalkyl, aryl, alkylaryl and aralkyl radicals, having 1 to 18 carbon atoms, and R'' is a member selected from the group consisting of aliphatic and aromatic dicarboxylic monoester residual radicals, having 1 to 18 carbon atoms;

$$R_2Sn(A)_2 \quad (II)-9$$

wherein R is a member selected from the group consisting of alkyl, cycloalkyl, aryl, alkylaryl and aralkyl radicals, having 1 to 18 carbon atoms, A is a 1,3 - dicarbonyl compound, and small $x$ is dependent on the number of Sn atoms in the Formulas (II)-1 to (II)-9.

2. Dyeable polypropylene fibers according to claim 1, characterized by that the compound of the general Formula I is prepared from one kind of compounds represented by the general formulae of (II)-1 to (II)-9 in claim 1, and one kind of compounds represented by the general formula of (III)

wherein R, X, M and $m$ have the same meaning as in claim 1, are allowed to react together with an organic solvent.

3. Dyeable polypropylene fibers which are prepared by melt spinning a mixture of one kind of compounds represented by the general formulae of (II)-1 to (II)-9 in claim 1, and one kind of compounds represented by the general Formula III given in claim 2 and polypropylene, a compound represented by the general Formula I being formed in situ.

4. Dyeable polypropylene fibers according to claim 1, which contains an intermolecular compound represented by the Formula I in an amount of 0.1% to 10% by weight to polypropylene.

References Cited

FOREIGN PATENTS 622,739 3/1963 Belgium.

JOSEPH L. SCHOFER, *Primary Examiner.*

D. DENENBERG, *Assistant Examiner.*